UNITED STATES PATENT OFFICE.

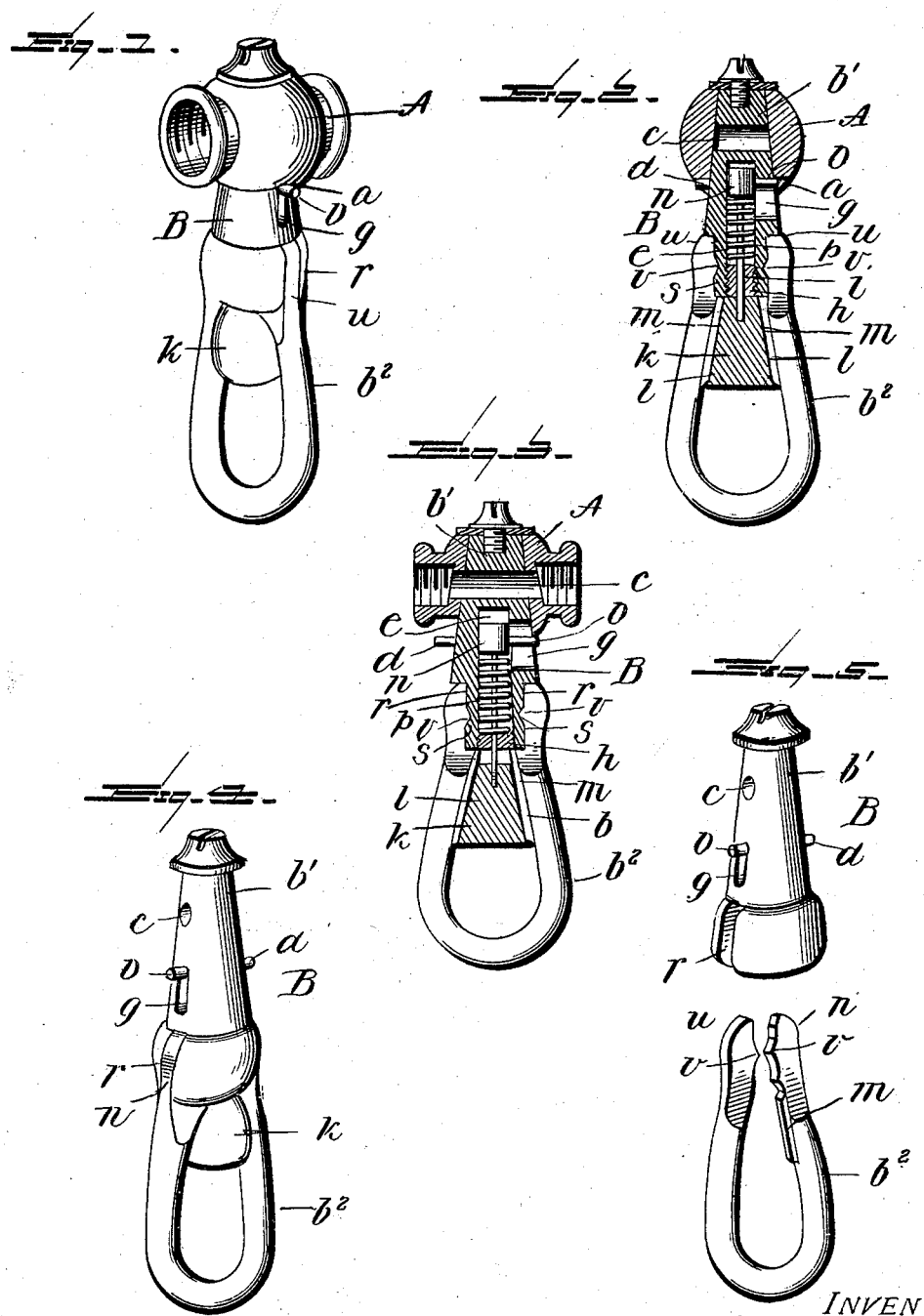

CHARLES F. KINCHELOE, OF QUINCY, ILLINOIS.

GAS OR OTHER COCK.

SPECIFICATION forming part of Letters Patent No. 679,899, dated August 6, 1901.

Application filed March 22, 1901. Serial No. 52,383. (No model.)

*To all whom it may concern:*

Be it known that I, CHARLES F. KINCHE-LOE, a citizen of the United States, and a resident of the city of Quincy, in the county of Adams and State of Illinois, but now temporarily residing in the city of Washington, in the District of Columbia, have invented certain new and useful Improvements in Gas or other Cocks for Controlling the Flow of Liquids and Fluids, of which the following is a specification.

My invention relates generally to cocks for the regulation or control of the flow of liquids and fluids of whatsoever kind, but more especially to those for the regulation or control of the flow of gas, and particularly to that class of the latter known as "safety-cocks;" and the object of the invention is to provide for gas and other cocks an automatic or self-locking device by means of which the cock when so operated as to stop the flow of the liquid or fluid will be automatically locked, so as to prevent the possibility of its being accidentally so operated as to permit the flow of the liquid or fluid when not desired.

As my invention is intended to relate and apply more especially to cocks for regulating or controlling the flow of gas, it will for convenience in describing and explaining its construction and operation be hereinafter considered in this connection.

In the drawings forming a part of this specification, and in which like letters of reference designate corresponding parts in the several views, Figure 1 is a vertical side view in perspective of a gas-cock embodying my improvements with the valve, or key, turned and locked in such position as to prevent the flow of the gas. Fig. 2 is a vertical sectional end view of the cock in detail, showing its construction and its different parts in the position occupied when the gas is turned off. Fig. 3 is a vertical sectional side view of the cock in detail, showing the parts in the position occupied when the gas is turned on. Fig. 4 is a view in perspective of the valve detached from the body of the cock. Fig. 5 is a view in perspective of the two parts of the body of the valve.

Referring to the drawings, A is the shell or body of the cock. It is of the ordinary form and construction and is provided with the usual perforations for the passage of the gas and the reception of the valve and also with the usual shoulders or stops $a\ a$ for limiting the rotation of the valve.

B is the valve, or key, the body of which is composed of two separate parts or pieces, the plug $b'$ and the thumb-piece $b^2$, adapted to be firmly attached together, as illustrated in the drawings and hereinafter described; but while I have illustrated the body of the valve to be composed of two separate parts or pieces it is not essential that it consist of separate parts, and I do not mean to limit myself to this particular construction, as a valve-body consisting of a single piece can readily be used in the construction of my improved valve. In general contour the body of the valve may be any of the usual forms or designs adapted to permit the combination of my improvements therewith. The plug end of the valve, as illustrated in the drawings, is provided with the ordinary screw-hole, screw, and washer for attaching and adjusting the valve in the shell, or body, of the cock. The plug $b'$ is provided with the usual transverse perforation $c$ for the passage of the gas therethrough and also with the usual fixed stop-pin $d$ for limiting the rotation of the valve by said pin coming into contact with one or the other of the two shoulders or stops $a\ a$.

My improvements relate directly to and are embodied in the valve of the cock, the novel features and construction of which are substantially as follows: The base of the plug $b'$—that is, the end next to the thumb-piece $b^2$—has a longitudinal passage or channel $e$ extending from that end of the plug almost to the transverse gas - passage $c$, near which point it connects with a slot $g$, which extends transversely out through the wall of the plug. The open end of the channel $e$ is threaded to receive and hold the perforated screw $h$. Within the passage $e$ and fitted in such manner as to permit of easy longitudinal movement is a stem $i$, the lower portion of which is adapted to pass and move freely through the perforation or hole in the screw $h$. The lower end of the stem $i$ is threaded to receive and hold the operating-button $k$, which is provided with a screw-hole for attaching it to said end of the stem $i$. The operating-button $k$ is also provided with two similar lateral and opposite grooves $l\,l$, in which operate the two guides $m\,m$ of the thumb-piece $b^2$. The upper end of the stem $i$ is enlarged into a longitudinal cylindrical knob $n$, containing a lateral screw-hole, into which is firmly fitted the threaded end of a pin $o$, which extends out through the slot $g$ to slightly beyond the surface of the plug and which is adapted to move freely longitudinally in said slot. On the stem $i$ and between the knob $n$ and the perforated screw $h$ is a loosely-fitting spiral spring $p$, sufficiently compressed to extend the stem $i$ upward until the pin $o$ when not obstructed will press against the upper or farther extremity of the slot $g$. For the attachment together of the plug $b'$ and the thumb-piece $b^2$ the base of the plug is provided with two similar and opposite longitudinal grooves $r\,r$, in the bottom of each of which is a transverse notch $s$. The plug end of the thumb-piece $b^2$ terminates in two similar and opposite jaws $u\,u$, on the inner surface of each of which is a transverse tooth $v$, the jaws $u\,u$ and the teeth $v\,v$ being of such size, form, and distance apart that they will respectively fit snugly and firmly into the grooves $r\,r$ and the notches $s\,s$, as illustrated in Figs. 2 and 3. To attach the thumb-piece to the plug, the ends of the jaws $u\,u$ are inserted into the base ends of the grooves $r\,r$ and then forced into and along said grooves until the teeth $v\,v$ reach and fit into the notches $s\,s$. When the teeth $v\,v$ first reach and come into contact with the end of the plug in this process of attachment, the jaws $u\,u$ are forced slightly farther apart, thus creating a tension, which causes the teeth $v\,v$ to fit firmly and graspingly into the notches $s\,s$ when the thumb-piece has reached its proper position on the plug.

The practical operation of my improved cock is as follows: With the gas turned off, as illustrated in Figs. 1 and 2, the fixed pin $d$ rests against one and the movable pin $o$ against the other of the two shoulders or stops $a\,a$ of the shell, or body, of the cock, thus locking the valve in the position it then occupies and preventing its being rotated in either direction while the movable pin $o$ remains in that position. To turn on the gas, the operator grasps the operating-button $k$ between his thumb and finger and draws it down against the tension of the spring $p$ until the movable pin $o$ can pass over the shoulder $a$, by which it was intercepted, when the valve can then be rotated and the gas turned on in the usual way. After the gas has been turned on and the operating-button $k$ released by the operator the movable pin $o$ rests against the margin of the shell, or body, of the cock, as shown in Fig. 3. In turning off the gas the operator simply grasps the thumb-piece and rotates the valve in the usual way and in either direction until the fixed pin $d$ comes into contact with one of the two shoulders $a\,a$, whereupon the movable pin $o$, having passed beyond and lost the support of the extended or shoulder portion of the shell A, is forced by the tension of the spring $p$ acting upon the stem $i$ in front of the other shoulder $a$ in the position shown in Figs. 1 and 2, the valve thus being automatically and securely locked in the position then occupied.

While I have shown and described my improvements as applied to one certain form of gas-cocks, it is to be understood that they may and are intended to be applied to other styles of gas-cocks, as well as to cocks and valves for fluids and liquids of any or all kinds, and it will be further understood that various changes in the specific forms, construction, and arrangement shown may be made without departing from the spirit of the invention.

What I claim as my invention, and desire to secure by Letters Patent, is—

1. A gas-cock comprising a shell which is provided with a gas-passage and a cavity for the valve and a margin around the valve-cavity having a high part and a low part with intervening shoulders, a valve having a fixed pin on one side and a movable pin on the other side, the movable pin being provided with a spring operating to press it against said margin and being arranged to be pressed by said spring so as to cause it to bear against either shoulder when the plug is turned, and the fixed pin being arranged to turn upon the low part of said margin and bear also against either shoulder, and means for withdrawing the movable pin, all substantially as described.

2. A safety gas-cock comprising a shell having a gas-passage and a cavity for the valve, with a high and a low part and intervening shoulders around the margin of the valve-cavity, and a valve provided with a fixed pin and a movable pin the movable pin being located in a slot and opposite the fixed pin, and provided also with a longitudinal passage and a stem located in said passage and connected with the movable pin whereby said movable pin may be drawn away from the margin about the valve-cavity, and a spring located in said passage for pressing the movable pin against said margin, all substantially as described.

3. A valve for gas or other cocks the plug portion of which has a fixed pin on one side and a movable pin located in a slot on the other side, a passage for the gas or other liquid or fluid, a longitudinal passage connecting with the slot in which said movable pin is located, and a spring and a stem located and supported in said longitudinal passage and connected with the movable pin for operating said movable pin, said stem being provided with a button attached to the free end thereof for operating said stem and movable pin, all substantially as described.

4. A valve for gas or other cocks which comprises a thumb-piece having two opposite jaws, and a plug having a fixed pin on one side and a movable pin on the other side and means for operating said movable said plug being adapted to receive and hold the jaws of the thumb-piece, and said jaws being adapted to fit to and firmly grasp and hold said plug, all substantially as described.

5. A gas or other cock comprising the shell A having the shoulders $a$ $a$ and being provided with the ordinary plug-cavity and passage for the gas or other liquid or fluid, the valve B having the fixed stop-pin $d$ and the guides $m$ $m$, longitudinal passage $e$, slot $g$, and passage $c$, and in combination with said shell and valve, the perforated screw $h$ fitting in the outer end of the passage $e$, the stem $i$ fitted to move easily in the passage $e$ and perforated screw $h$ and being provided with the knob $n$ and operating-button $k$, the movable pin $o$ transversely fixed in the knob $n$ and adapted to move easily in the slot $g$, and the spring $p$ fitted loosely in the passage $e$ and around the stem $i$ between the perforated screw $h$ and the knob $n$ in such manner as to press the pin $o$ against the shell A, all substantially as described.

6. A valve for gas or other cocks comprising the plug $b'$ having the longitudinal grooves $r$ $r$ provided with the transverse notches $s$ $s$, and the thumb-piece $b^2$ having the jaws $u$ $u$ provided with the transverse teeth $v$ $v$ and being adapted to fit to and grasp and firmly hold said plug, all substantially as described.

CHARLES F. KINCHELOE.

Witnesses:
GEORGE H. WALKER,
GEORGE M. ANDERSON.